(12) United States Patent
Miyagawa

(10) Patent No.: US 12,123,740 B2
(45) Date of Patent: Oct. 22, 2024

(54) TRAVEL ASSISTANCE METHOD AND TRAVEL ASSISTANCE DEVICE

(71) Applicants: Nissan Motor Co., Ltd., Yokohama (JP); Renault S.A.S., Boulogne-Billancourt (FR)

(72) Inventor: Tadahisa Miyagawa, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 438 days.

(21) Appl. No.: 17/256,265

(22) PCT Filed: Jul. 4, 2018

(86) PCT No.: PCT/IB2018/000830
§ 371 (c)(1),
(2) Date: Dec. 28, 2020

(87) PCT Pub. No.: WO2020/008221
PCT Pub. Date: Jan. 9, 2020

(65) Prior Publication Data
US 2021/0262825 A1    Aug. 26, 2021

(51) Int. Cl.
*G01C 21/00* (2006.01)
*G01C 21/30* (2006.01)
*G01S 19/01* (2010.01)

(52) U.S. Cl.
CPC ......... *G01C 21/3819* (2020.08); *G01C 21/30* (2013.01); *G01C 21/3804* (2020.08); *G01S 19/01* (2013.01)

(58) Field of Classification Search
None
See application file for complete search history.

(56) References Cited

U.S. PATENT DOCUMENTS 9,897,454 B2    2/2018  Shikimachi
10,215,572 B2   2/2019  Urano et al.
(Continued)

FOREIGN PATENT DOCUMENTS

EP    3324152 A1      5/2018
JP    H02-151714 A    6/1990
(Continued)

*Primary Examiner* — Tuan C To
*Assistant Examiner* — David Ruben Pedersen
(74) *Attorney, Agent, or Firm* — Young Basile Hanlon & MacFarlane, P.C.

(57) ABSTRACT

A travel assistance method causes a sensor to detect a lane boundary present around a vehicle, calculates own positions of the vehicle, converts a coordinate system of the detected lane boundary into a coordinate system equivalent to map data stored in in accordance with the own positions, and integrates configuration information on the lane boundary included in the map data with the lane boundary of which the coordinate system is converted to generate integrated data, wherein an integrated range is determined, when the configuration information is integrated with the lane boundary of which the coordinate system is converted, such that the lane boundary includes at least either parts having different curvatures or straight parts directed in different directions, and the configuration information is mapped with the lane boundary of which the coordinate system is converted to generate the integrated data while including at least the determined integrated range.

21 Claims, 11 Drawing Sheets

(56) References Cited

U.S. PATENT DOCUMENTS

| | | | |
|---|---|---|---|
| 2006/0239509 A1* | 10/2006 | Saito | G06V 10/753 |
| | | | 701/1 |
| 2014/0088862 A1 | 3/2014 | Simon | |
| 2016/0327400 A1 | 11/2016 | Shikimachi | |
| 2017/0122749 A1 | 5/2017 | Urano et al. | |
| 2018/0188045 A1* | 7/2018 | Wheeler | G06F 18/22 |
| 2019/0025071 A1 | 1/2019 | Fukui | |
| 2019/0351901 A1* | 11/2019 | Hori | B60W 40/06 |
| 2020/0172100 A1* | 6/2020 | Kato | G08G 1/16 |
| 2020/0385014 A1* | 12/2020 | Hanniel | G01C 21/3815 |

FOREIGN PATENT DOCUMENTS

| | | |
|---|---|---|
| JP | 2014-160064 A | 9/2014 |
| JP | 2015-152346 A | 8/2015 |
| JP | 2017-181870 A | 10/2017 |
| JP | 2017-198566 A | 11/2017 |
| RU | 2642547 C1 | 1/2018 |

\* cited by examiner

TRAVEL ASSISTANCE METHOD AND TRAVEL ASSISTANCE DEVICE

TECHNICAL FIELD

The present invention relates to a travel assistance method and a travel assistance device.

BACKGROUND

Japanese Unexamined Patent Application Publication No. 2017-181870 discloses a technique that determines the presence or absence of inconsistency between measurement information in the real world acquired by a sensor and a map as a reference to the surroundings.

SUMMARY

The technique disclosed in Japanese Unexamined Patent Application Publication No. 2017-181870 does not take account of a road configuration in a range in which the measurement information and the map are subjected to matching. If there are not particular characteristics regarding the road configuration, for example, when the road configuration in the range to be subjected to matching only includes a straight shape or a curved shape having a constant curvature, a difference in the matching may be caused.

The present invention provides a travel assistance method and a travel assistance device capable of appropriately executing matching between configuration information on a road in map data and configuration information on a road detected by a sensor.

An aspect of the present invention is a travel assistance method including detecting a lane boundary present around a vehicle by a sensor, calculating own positions of the vehicle, converting a coordinate system of the detected lane boundary into a coordinate system equivalent to map data stored in a storage device in accordance with the own positions, and integrating configuration information on the lane boundary included in the map data with the lane boundary of which the coordinate system is converted so as to generate integrated data, wherein an integrated range is determined, when the configuration information is integrated with the lane boundary of which the coordinate system is converted, such that the lane boundary includes at least either a plurality of parts having different curvatures or a plurality of straight parts directed in different directions, and the configuration information is mapped with the lane boundary of which the coordinate system is converted so as to generate the integrated data while including at least the determined integrated range.

The object and advantages of the present invention will be realized and attained by means of the elements and combinations particularly pointed out in the appended claims. It is to be understood that both the foregoing general description and the following detailed description are exemplary and explanatory and are not restrictive of the present invention as claimed.

DETAILED DESCRIPTION

Figure 1:
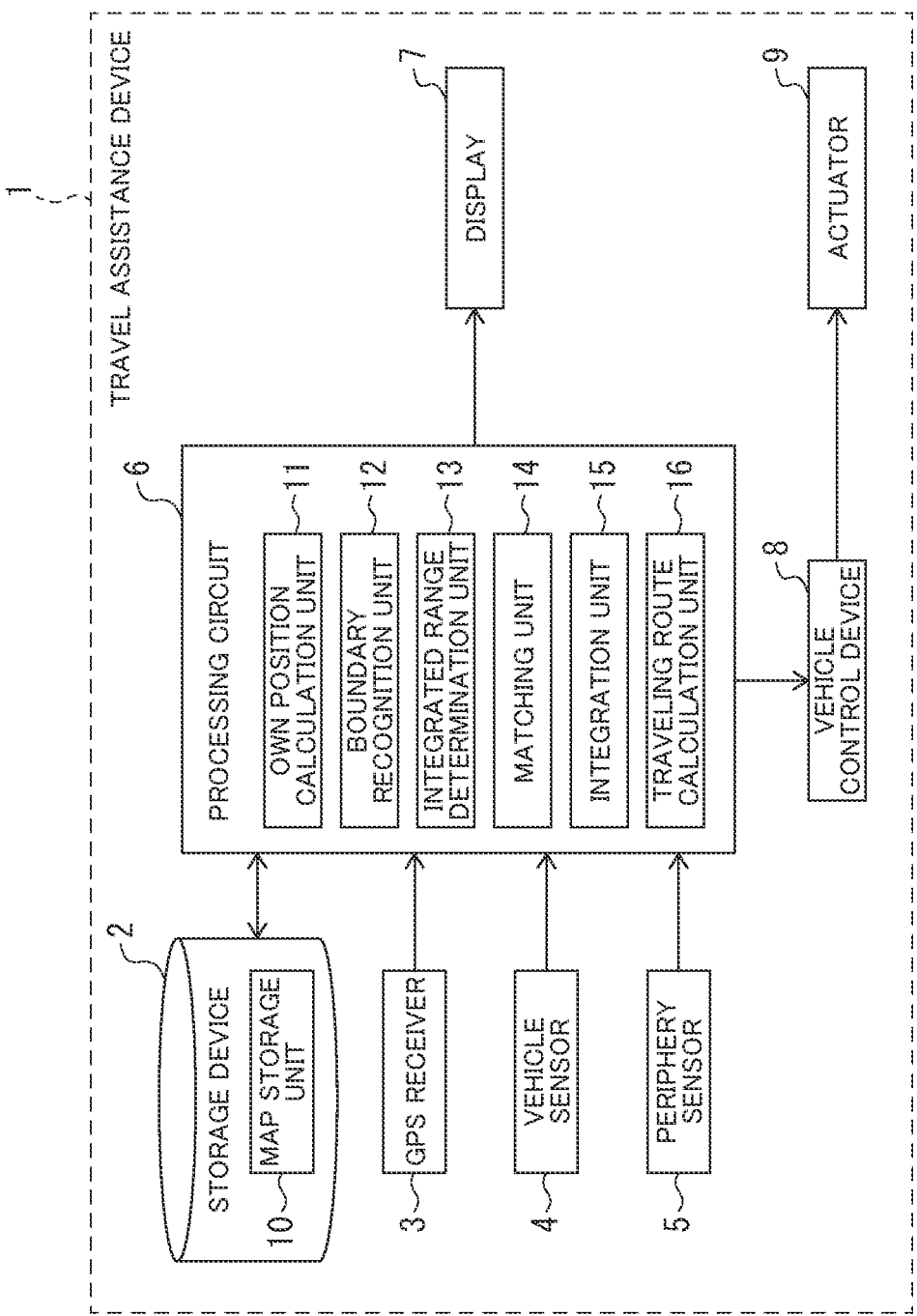
FIG. 1 is a diagram illustrating an example of a schematic configuration of a travel assistance device according to an embodiment of the present invention.

An embodiment of the present invention will be described below with reference to the drawings. The same or similar elements mentioned in the following descriptions of the drawings are denoted by the same or similar reference numerals.

(Travel Assistance Device)

A travel assistance device according to the embodiment of the present invention can be mounted on a vehicle (hereinafter, a vehicle on which the travel assistance device according to the embodiment of the present invention is mounted is referred to as a "host vehicle"). As illustrated in FIG. 1, the travel assistance device 1 according to the embodiment of the present invention includes a storage device 2, a global positioning system (GPS) receiver (a GPS sensor) 3, a vehicle sensor 4, a periphery sensor 5, a processing circuit 6, a display 7, a vehicle control device 8, and an actuator 9. The processing circuit 6 can communicate with the storage device 2, the GPS receiver 3, the vehicle sensor 4, the periphery sensor 5, the display 7, and the vehicle control device 8 so as to transfer and receive data and signals through a controller area network (CAN) bus, for example, in a wired or wireless manner.

The storage device 2 can be a semiconductor memory, a magnetic memory, or an optical memory, for example. The storage device 2 may be installed in the processing circuit 6. The storage device 2 includes a map storage unit 10 for storing map data. The travel assistance device 1 according to the embodiment of the present invention integrates the map data stored in the map storage unit 10 with point data acquired by the periphery sensor 5. The map data stored in the map storage unit 10 may be high definition map data (hereinafter referred to simply as "high definition map").

The high definition map is suitably used for autonomous driving. The high definition map is map data having higher definition than map data for navigation (referred to simply as "navigation map"), and includes information per lane which is more specific than information per road. For example, the high definition map includes, as the information per lane, information on lane nodes indicating reference points on a lane reference line (for example, a center line in a lane), and information on lane links indicating sectional aspects of a lane between the respective lane nodes. The information on the lane nodes includes a corresponding identification number, positional coordinates, the number of lane links to be connected with, and an identification number of the respective lane links to be connected with. The information on the lane links includes a corresponding identification number, a lane type, a lane width, a lane figure, a type of a lane boundary, a figure of a lane boundary, and a figure of a lane reference line.

The high definition map further includes information on objects on the ground, such as the type and positional coordinates of each object on the ground including a traffic signal, a stop line, a sign, a building, a telegraph pole, a curb, and a crosswalk present in or around a lane, and the identification number of each lane node and the identification number of each lane link corresponding to the positional coordinates of each object on the ground. Since the high definition map includes the information on the nodes and links per lane, the lane on a traveling route in which the host vehicle is currently traveling can be specified. The high definition map includes coordinates indicative of a position of each lane in the extending direction and the width direction. The high definition map also includes coordinates indicative of a position of an object in a three-dimensional space (such as a longitude, a latitude, and an altitude), and each lane and each object described above on the ground can be indicated by the corresponding figures in the three-dimensional space.

The high definition map may include point group data on constituent points (boundary points) composing lane boundaries, for example. The map data integrated by the travel assistance device 1 with the data on the lane boundaries acquired by the periphery sensor 5, is not necessarily the high definition map, and is only required to be map data including the point group data on the constituent points composing the lane boundaries.

A database for the map data may be controlled in a server, on the outside of the travel assistance device 1, and updated difference data of the map data may be acquired through telematics, for example, so as to update the map data stored in the map storage unit 10. Alternatively, the map data may be acquired through telematics such as vehicle-to-vehicle communications or road-to-vehicle communications depending on the position at which the host vehicle is traveling. The use of telematics eliminates the necessity of storing the map data requiring large data capacity in the host vehicle, so as to save the capacity of the memory. The use of telematics further enables the acquisition of the map data to be updated, so as to accurately recognize actual traveling situations such as a change in road structure and the presence or absence of road repair or construction. The use of telematics also enables the recognition of accurate information since the map data generated on the basis of the data acquired from plural other vehicles other than the host vehicle can be used.

The GPS receiver 3 receives radio waves from a plurality of navigation satellites to acquire a current position (own position) of the host vehicle, and outputs the acquired current position of the host vehicle to the processing circuit 6. A global navigation satellite system (GNSS) receiver may be included instead of the GPS receiver 3.

The vehicle sensor 4 is a sensor for detecting the current position and the traveling state (behavior) of the host vehicle. The vehicle sensor 4 may include a speed sensor, an acceleration sensor, a gyro sensor, and a yaw rate sensor, but the type and the number of the vehicle sensor are not limited to the above case. The speed sensor may detect a speed according to a wheel speed of the host vehicle to output the detected speed to the processing circuit 6. The acceleration sensor may detect an acceleration in the front-rear direction and the vehicle width direction of the host vehicle, for example, to output the detected acceleration to the processing circuit 6. The gyro sensor may detect an angular velocity of the host vehicle to output the detected angular velocity to the processing circuit 6. The yaw rate sensor, for example, may detect an angular velocity of rotation (yaw rate) around the vertical axis passing through the point of the center of gravity of the host vehicle to output the detected yaw rate to the processing circuit 6.

The periphery sensor 5 is a sensor for detecting the surroundings (surrounding situation) around the host vehicle. The periphery sensor 5 may include a camera, a radar, and a communications device, but the type and the number of the periphery sensor 5 are not limited to the above case. The camera used as the periphery sensor 5 may be a CCD camera, for example. The camera may be either a monocular camera or a stereo camera. The camera captures the surroundings of the host vehicle, detects, as data of the surroundings of the host vehicle from the captured images, a relative position between the host vehicle and an object such as another vehicle, a pedestrian, or a bicycle, a distance between each object and the host vehicle, and a road structure such as lane boundaries (white lines) or curbs on a road, and outputs the detected data on the surroundings to the processing circuit 6.

The radar used as the periphery sensor 5 may be a millimeter-wave radar, an ultrasonic-wave radar, or a laser range finder (LRF), for example. The radar detects, as data on the surroundings of the host vehicle, a relative position of an object with respect to the host vehicle, a distance between the object and the host vehicle, and a relative velocity between the object and the host vehicle, and outputs the detected data on the surroundings to the processing circuit 6.

The communication device used as the periphery sensor 5 may receive data on the surroundings of the host vehicle including the own position of the host vehicle, through vehicle-to-vehicle communications with other vehicles, road-to-vehicle communications with a road side unit, or communications with a traffic information center, for example, and output the detected data on the surroundings to the processing circuit 6. Each of the GPS receiver 3, the vehicle sensor 4, and the periphery sensor 5 as used herein can be used as a sensor capable of detecting the actual (real) road structure and the like around the host vehicle.

The processing circuit 6 is a controller such as an electronic control unit (ECU) for performing arithmetic logic operations necessary for the processing of the travel assistance for the host vehicle. The processing circuit 6 may include a processor, a storage device, and an input-output I/F. The processor may be a central processing unit (CPU) including an arithmetic logic unit (ALU), a control circuit (control device), and various types of registers, or a microprocessor equivalent to the CPU. The storage device installed in or externally attached to the processing circuit 6 may be a semiconductor memory or a disk medium, for example, and may include a register, a cache memory, and a storage medium such as a ROM or a RAM used as a main storage device. The processor included in the processing circuit 6 executes a program preliminarily stored in the storage device so as to cause the travel assistance device 1 to execute information processing described below.

For example, the processing circuit 6 may output guidance information based on the map data stored in the map storage unit 10 from the display 7 or any other information presentation device such as a speaker to present the information to an occupant. The processing circuit 6 may execute the travel assistance for the host vehicle, for example. The term "travel assistance" may refer to either completely-automated driving that the host vehicle drives autonomously without the operation of the occupant (such as the driver) involved, or driving assistance in controlling at least one of driving, braking, and steering. The term "travel assistance" as used herein encompasses the case of controlling all of the driving, braking, and steering of the host vehicle without the occupant involved, and the case of controlling at least one of the driving, braking, and steering of the host vehicle.

The processing circuit 6, when executing the travel assistance, generates a traveling route on which the host vehicle is to travel, in accordance with the map data stored in the map storage unit 10. The traveling route includes a traveling track per lane, in addition to the traveling route per road from a current position of the host vehicle to a destination. The traveling track may include a travel control profile such as a velocity profile. For example, the processing circuit 6 specifies the position of the host vehicle in the map data, and generates the traveling route (the traveling track) so as to be drawn along the lane on the basis of the position of the host vehicle. The traveling route (the traveling track) may be generated along the center of the lane, for example.

The processing circuit 6, when generating the traveling route, refers to the map data stored in the map storage unit 10, and can also acquire high-accuracy positional information on the surroundings from the periphery sensor 5. The processing circuit 6 thus preferably prepares, in addition to the map data, integrated data in which the map data is integrated with the data on the surroundings acquired from the periphery sensor 5 to generate the traveling route using the integrated data. The processing circuit 6 outputs the generated traveling route to the vehicle control device 8.

The vehicle control device 8 is an ECU for executing the travel control for the host vehicle. The vehicle control device 8 includes a processor and peripheral components such as a storage device. The processor may be a CPU or an equivalent microprocessor, for example. The storage device may include any of a semiconductor memory, a magnetic memory, and an optical memory. The storage device may include a register, a cache memory, and a memory such as a ROM or a RAM used as a main storage device. The vehicle control device 8 may be implemented by a functional logic circuit set in a general-purpose semiconductor integrated circuit. For example, the vehicle control device 8 may include a programmable logic device (PLD) such as a field-programmable gate array (FPGA).

The vehicle control device 8 calculates the control amount of the actuator 9 so that the host vehicle travels on the traveling route generated by the processing circuit 6. The vehicle control device 8 sends the calculated control amount to the actuator 9. The actuator 9 controls the host vehicle to travel in accordance with the control signal received from the vehicle control device 8. The actuator 9 may be a drive actuator, a brake actuator, and a steering actuator. The drive actuator may be an electronic control throttle valve, for example, to regulate an opening degree of the accelerator of the host vehicle in accordance with the control signal received from the vehicle control device 8. The brake actuator may be a hydraulic circuit, for example, to control a braking operation of the brake of the host vehicle in accordance with the control signal received from the vehicle control device 8. The steering actuator controls the steering of the host vehicle in accordance with the control signal received from the vehicle control device 8.

Figure 2:
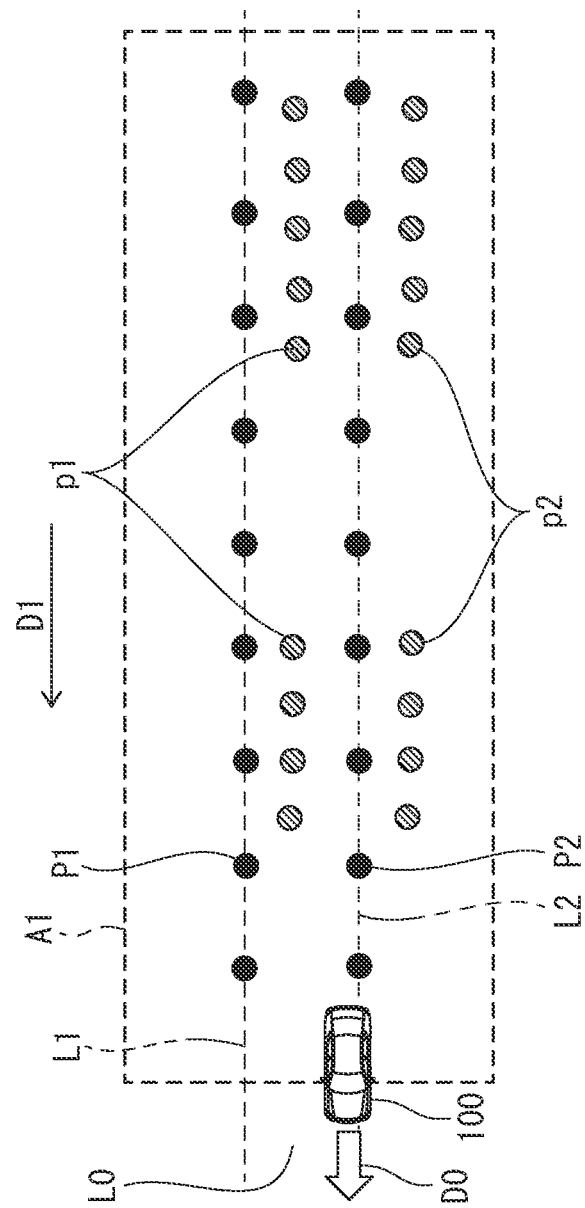
FIG. 2 is an explanatory view of an example of matching processing.
Figure 3:
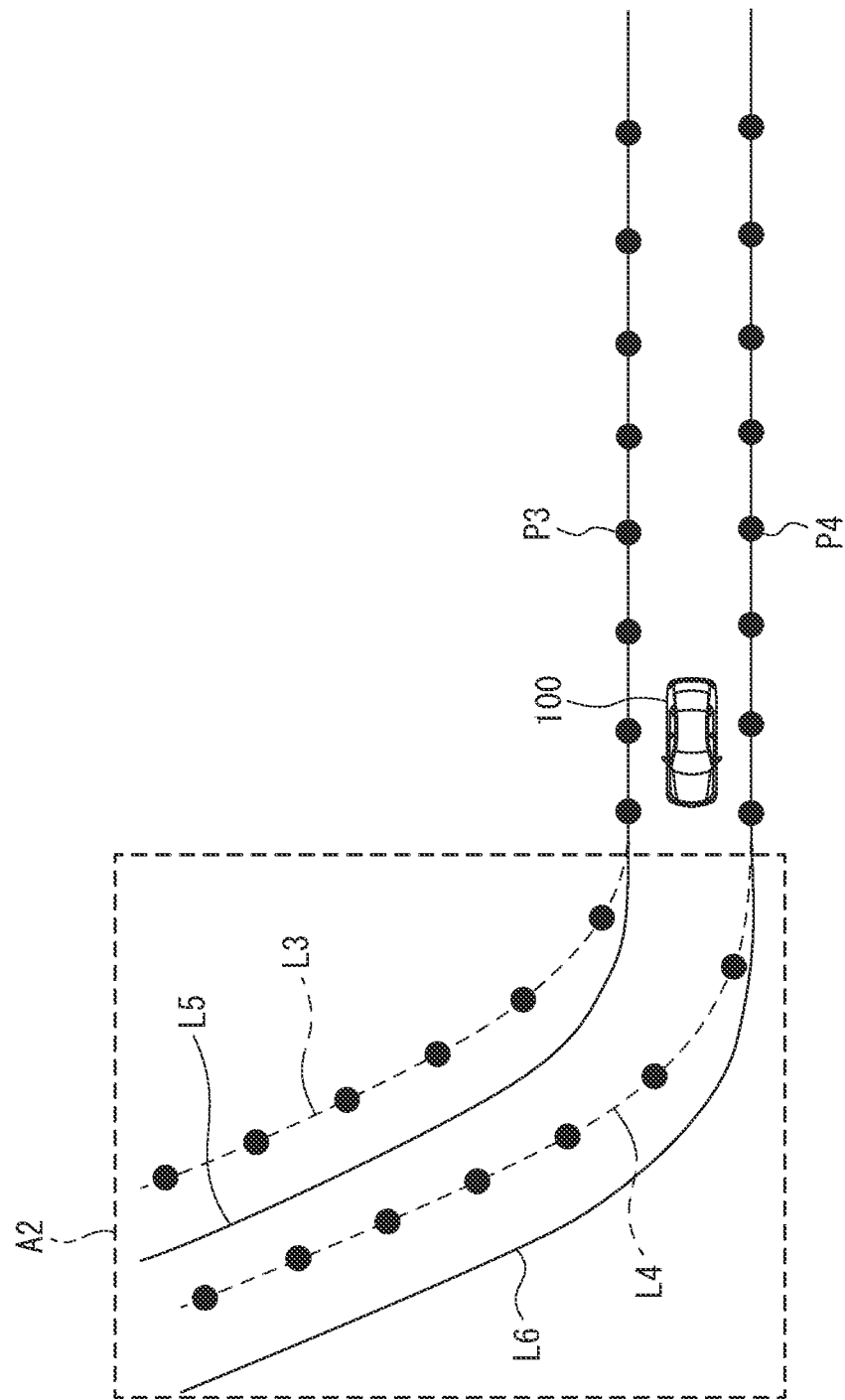
FIG. 3 is an explanatory view of an example of a matching result.

The traveling situations in which the travel assistance device 1 according to the embodiment of the present invention is effective are described below with reference to FIG. 2 and FIG. 3. As illustrated in FIG. 2, the map data stores positional coordinates of a plurality of constituent points P1 composing a lane boundary L1 on one side defining a lane L0 in which the host vehicle 100 is traveling, and positional coordinates of a plurality of constituent points P2 composing a lane boundary L2 on the other side defining the lane L0. The periphery sensor 5 detects lane boundaries in the real world corresponding to the lane boundaries L1 and L2 when the host vehicle 100 is traveling, so as to detect positional coordinates of a plurality of detection points p1 when detecting the lane boundary in the real world corresponding to the lane boundary L1 and positional coordinates of a plurality of detection points p2 when detecting the lane boundary in the real world corresponding to the lane boundary L2. FIG. 2 indicates the forward direction D0 of the host vehicle 100 and the forward direction D1 of the lane L0 by the respective arrows.

The following is a case presumed to execute mapping between the constituent points P1 and P2 as the configuration information on the lane boundaries L1 and L2 in the map data and the detection points p1 and p2 detected by the periphery sensor 5 through matching (comparison) processing so as to generate the integrated data in a predetermined integrated range (a matching range) A1. The lane L0 in the integrated range A1 in this case has a road configuration which has a simple straight line with no particular characteristics, which may lead to a difference in the matching in the forward direction D1 of the lane L0, since the data in the forward direction D1 of the lane L0 is not binding. The constituent points P1 and P2 in the map data are then presumed to be corrected so as to decrease the error with respect to the detection points p1 and p2, for example. This case may lead to a gap between lane boundaries L3 and L4 consisting of constituent points P3 and P4 obtained after the correction and lane boundaries L5 and L6 in the real world in the range A2 after the road configuration is changed from the straight to the curve, as illustrated in FIG. 3.

As in the case of the road configuration with the straight line, a curved road having a predetermined curvature has no particular characteristics, and leads to a difference in the matching in the forward direction of the lane. The travel assistance device 1 according to the embodiment of the present invention can determine an appropriate integrated range when generating integrated data including the matching processing in view of the characteristics of the road configuration while avoiding a difference in the matching, so as to appropriately generate the integrated data.

As illustrated in FIG. 1, the processing circuit 6 in the travel assistance device 1 according to the embodiment of the present invention includes a logical block, as functional or physical hardware resources, including an own position calculation unit 11, a boundary recognition unit 12, an integrated range determination unit 13, a matching unit 14, an integration unit 15, and a traveling route calculation unit 16. The own position calculation unit 11, the boundary recognition unit 12, the integrated range determination unit 13, the matching unit 14, the integration unit 15, and the traveling route calculation unit 16 may implement a physical logic circuit which can be a PLD such as a FPGA, for example, or a functional logic circuit equivalently set in a general-purpose semiconductor integrated circuit through the processing of software.

The own position calculation unit 11, the boundary recognition unit 12, the integrated range determination unit 13, the matching unit 14, the integration unit 15, and the traveling route calculation unit 16 may be implemented by a single piece of hardware, or may each be implemented by individual hardware. For example, the own position calculation unit 11, the boundary recognition unit 12, the integrated range determination unit 13, the matching unit 14, the integration unit 15, and the traveling route calculation unit 16 may be implemented in a car navigation system such as an in-vehicle infotainment (IVI) system, and the vehicle control device 8 may be implemented by a travel assistance system such as an advanced driver-assistance system (ADAS).

The own position calculation unit 11 acquires a history (a sequence of points) of own positions of the host vehicle from the GPS receiver 3 or through vehicle-to-vehicle communications or road-to-vehicle communications. The own position calculation unit 11 may convert a coordinate system of the own positions of the host vehicle in the real world into the same coordinate system as the map data so as to calculate the own positions of the host vehicle in the map data. For example, the positional coordinates of the own positions of the host vehicle in the real world acquired from the GPS receiver 3 are converted into the positional coordinates in the map coordinate system. The own position calculation unit 11 may calculate the moving amount and the moving direction of the host vehicle from the vehicle information (odometry information) such as a wheel velocity and a yaw rate of the host vehicle detected by the vehicle sensor 4, namely, calculate the history of the own positions through odometry. The own position calculation unit 11 may subject the points composing the history of the own positions to curve fitting so as to calculate the traveling track of the host vehicle.

The boundary recognition unit 12 recognizes lane boundaries according to the data on the surroundings detected by the periphery sensor 5. The boundary recognition unit 12 recognizes, as lane boundaries, lane markers such as white lines, for example. The lane boundaries to be recognized may be any type, and are only required to be targets included as lane boundaries in the map data. For example, the boundary recognition unit 12 may recognize structures such as side ditches, curbs, guardrails, and pillars as lane boundaries.

The boundary recognition unit 12 also converts a coordinate system of the recognized lane boundaries into the same coordinate system as the map data, in accordance with the own positions calculated by the own position calculation unit 11. For example, the boundary recognition unit 12 converts a coordinate system of the detection points of the lane boundaries, which is a local coordinate system using the own positions as the origin, into a map coordinate system that the map data refers to, in accordance with the own positions of the host vehicle acquired by the own position calculation unit 11 from the GPS receiver 3. The converted target is not limited to the map coordinate system, and the coordinate system may be a relative coordinate system, for example, that uses a format enabling the positioning.

Figure 4:
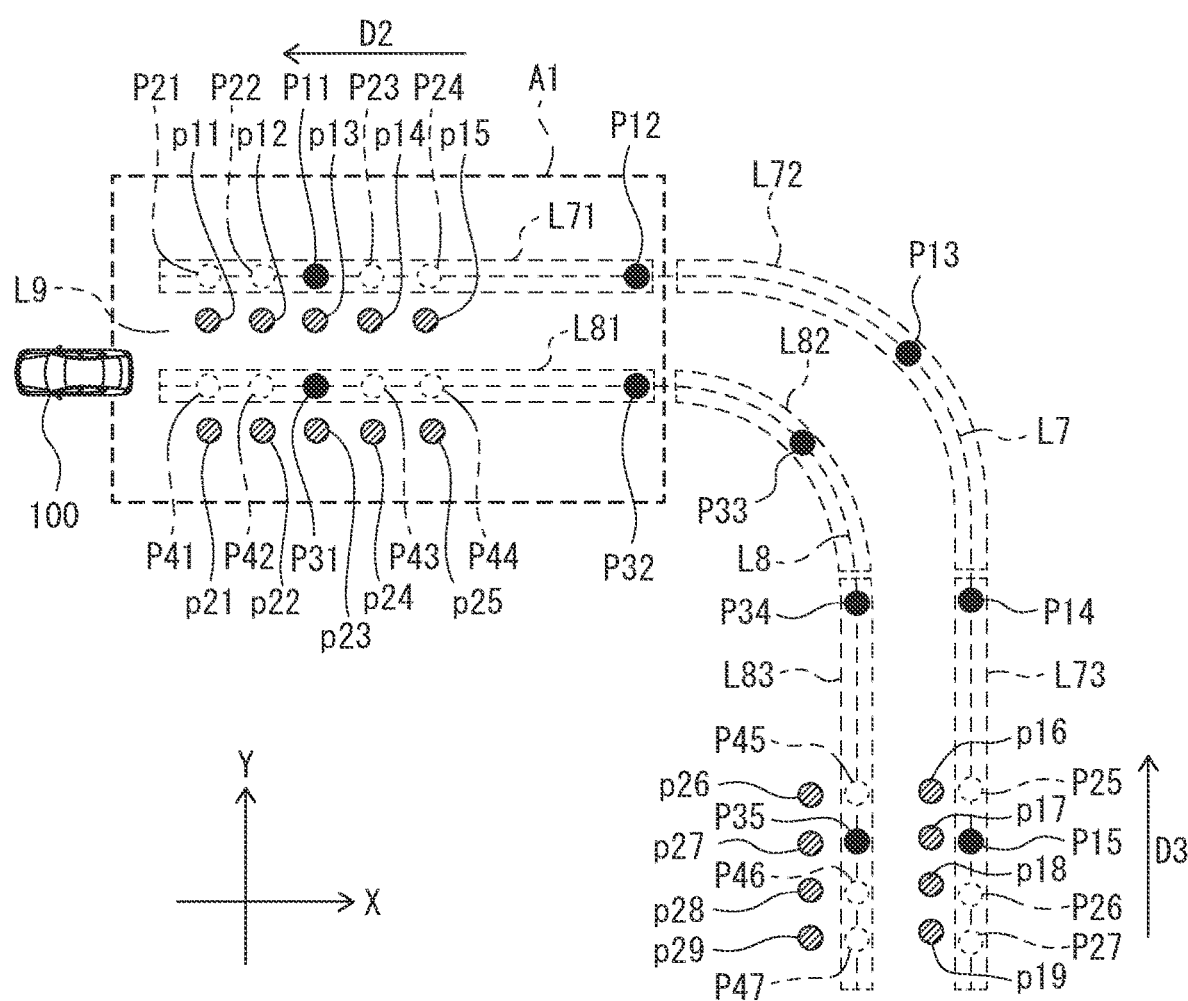
FIG. 4 is an explanatory view illustrating an example of processing of determining an integrated range.

For example, as illustrated in FIG. 4, the map data stores positional coordinates of a plurality of constituent points P11, P12, P13, P14, and P15 composing a lane boundary L7 on one side defining a lane L9 in which the host vehicle 100 is traveling, and positional coordinates of a plurality of constituent points P31, P32, P33, P34, and P35 composing a lane boundary L8 on the other side. The broken lines indicating the respective lane boundaries L7 and L8 are presumed to be obtained through interpolation of the respective constituent point P11 to P15 and P31 to P35 by curves. FIG. 4 defines the X direction in which the direction toward the east in the east-west direction in the map coordinate system is a positive direction, and defines the Y direction in which the direction toward the north in the north-south direction in the map coordinate system is a positive direction.

The lane boundary L7 has a part (a straight part) L71 extending in the forward direction D2 of the lane L9, a part (a curved part) L72 connected to the straight part L71 and curved leftward, and a part (a straight part) L73 connected to the curved part L72 and extending in the forward direction D3 of the lane L9 orthogonal to the forward direction D2. The lane boundary L8 has a part (a straight part) L81 extending in the forward direction D2, a part (a curved part) L82 connected to the straight part L81 and curved leftward, and a part (a straight part) L83 connected to the curved part L82 and extending in the forward direction D3 orthogonal to the forward direction D2.

The periphery sensor 5 detects lane boundaries in the real world corresponding to the lane boundaries L7 and L8 when the host vehicle 100 is traveling. The boundary recognition unit 12 recognizes the lane boundaries in the real world corresponding to the lane boundaries L7 and L8 according to the detection result obtained by the periphery sensor 5, and calculates positional coordinates of a plurality of detection points p11 to p19 when detecting the lane boundary in the real world corresponding to the lane boundary L7 and positional coordinates of a plurality of detection points p21 to p29 when detecting the lane boundary in the real world corresponding to the lane boundary L8. While FIG. 4 illustrates the case of recognizing the lane boundaries in the real world corresponding to the pair of the lane boundaries L7 and L8, the lane boundary in the real world corresponding to either the lane boundary L7 or the lane boundary L8 may only be recognized. While FIG. 4 illustrates the detection points p11 to p19 and p21 to p29 behind the host vehicle 100, the lane boundaries L7 and L8 may be detected on the front and lateral sides of the host vehicle 100 during traveling so as to obtain the detection points.

The integrated range determination unit 13 determines the integrated range (the matching range) when the configuration information on the lane boundaries included in the map data is integrated with the information on the lane boundaries detected by the periphery sensor 5. For example, the integrated range determination unit 13 determines the integrated range such that the respective lane boundaries include a plurality of parts having different curvatures or radii of curvature. For example, each radius of curvature can be obtained such that the curved part of each lane boundary is approximated to a circular arc, and each curvature can be obtained as an inverse of the radius of curvature. Each of the plural parts may be either a straight part or a curved part. Namely, the plural parts may be a combination of two or more curved parts having different curvatures, or a combination of a straight part and a curved part.

For example, as illustrated in FIG. 4, the curvature of the respective straight parts 71 and L73 is zero, which is different from the curvature of the curved part 72. The integrated range determination unit 13 may determine the integrated range so as to include the two parts L71 and L72 of the lane boundary L7, or determine the integrated range so as to include the two parts L72 and L73. Alternatively, the integrated range determination unit 13 may determine the integrated range so as to include the three parts L71, L72, and L73 of the lane boundary L7.

The integrated range determination unit 13 may determine the integrated range such that the lane boundary includes a plurality of straight parts directed in different directions. Alternatively, the integrated range determination unit 13 may determine the integrated range such that the lane boundary includes a plurality of straight parts making an angle with each other which is a predetermined threshold (for example, 30 degrees) or greater and a predetermined threshold (for example, 90 degrees) or less. In other words, the integrated range determination unit 13 may determine the integrated range such that the lane boundary includes a plurality of straight parts making different angles with a predetermined direction (for example, the X direction in FIG. 4). For example, as illustrated in FIG. 4, the integrated range determination unit 13 may determine the integrated range such that the lane boundary L7 includes the two straight parts L71 and L73 directed in the directions orthogonal to each other.

For example, the integrated range determination unit 13 specifies the respective constituent points corresponding to the respective detection points obtained when the periphery sensor 5 detects the lane boundaries, according to the point group data on the constituent points composing the respective lane boundaries in the map data. The constituent points may be constituent points stored in the map data, or virtual constituent points allotted on a curve by which the respective constituent points stored in the map data are interpolated. The integrated range determination unit 13 estimates each angle made between a predetermined direction and the forward direction of the lane at the respective specified constituent points. The forward direction of the lane can be obtained from the attitude of the host vehicle or the link information included in the map data, for example. The integrated range determination unit 13 determines the integrated range such that a variation in the angles estimated at the respective constituent points is a predetermined threshold or greater. The variation in the angles may be obtained such that a difference between the data on the respective angles estimated at the respective constituent points and the average is obtained, and the respective differences are squared to calculate the average, so as to obtain a variance.

Alternatively, the integrated range determination unit 13 may specify the constituent points corresponding to the respective detection points obtained when the periphery sensor 5 detects the lane boundaries, and then interpolate the respective constituent points by a curve, so as to calculate the closest points on the curve with respect to the respective detection points. The integrated range determination unit 13 may then estimate each angle made between a predetermined direction and the forward direction of the lane at the respective closest points, and determine the integrated range such that a variation in the angles estimated at the respective closest points is a predetermined threshold or greater.

For example, as illustrated in FIG. 4, the integrated range determination unit 13 searches for the constituent points in the map data corresponding to the respective detection point p11 to p19 and p21 to p29 when the lane boundaries are detected by the periphery sensor 5 within a distance of a predetermined threshold from the respective detection points p11 to p19 and p21 to p29. The integrated range determination unit 13 then specifies the constituent points P11, P15, P31, and P35 corresponding to the detection points p13, p17, p23, and p27.

The integrated range determination unit 13 also interpolates the constituent points P11 to P15, including the specified constituent points P11 and P15, by the curve L7, and interpolates the constituent points P31 to P35, including the specified constituent points P31 and P35, by the curve L8. The integrated range determination unit 13 further calculates the closest points P21 to P27 as virtual constituent points on the curve L7 corresponding to the other detection points p11, p12, p14, p15, p16, p17, p18, and p19 at which the corresponding constituent points are not specified, and calculates the closest points P41 to P47 as virtual constituent points on the curve L8 corresponding to the other detection points p21, p22, p24, p25, p26, p27, p28, and p29.

The respective positional coordinates of the detection points p11 to p19 and p21 to p29, the constituent points P11 to P15 and P31 to P35, and the closest point P21 to P27 and P41 to P47, and the information of the mapping between the detection points p11 to p19 and p21 to p29 and each of the constituent points P11 to P15 and P31 to P35 and the closest points P21 to P27 and P41 to P47, are stored in the map storage unit 10 in the storage device 2, for example, and can be used as necessary when expanding the integrated range.

Figure 5:
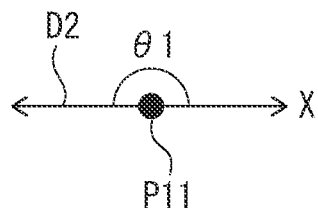
FIG. 5 is an explanatory view illustrating an example of processing of calculating an angle in a lane forward direction.
Figure 6:
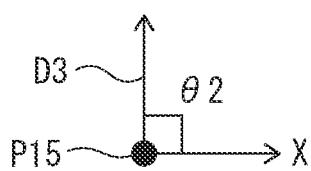
FIG. 6 is an explanatory view illustrating an example of processing of calculating an angle in a lane forward direction.

The integrated range determination unit 13 further estimates each angle made between a predetermined direction and the forward direction of the lane at the respective constituent points P11 to P15 and the closest points P21 to P27. For example, as illustrated in FIG. 5, when the X direction at the constituent point P11 is set to zero degrees, the angle θ1 of the forward direction D2 of the host vehicle with respect to the X direction measured counterclockwise is 180 degrees. Similarly, as illustrated in FIG. 6, the angle θ2 of the forward direction D3 of the host vehicle with respect to the X direction at the constituent point P15 measured counterclockwise is 90 degrees. The respective angles at the constituent points P12 to P14 and the closest points P21 to P27 are calculated in the same manner. The respective angles at the constituent points P31 to P35 and the closest points P41 to P47 are also calculated in the same manner.

Figure 7:
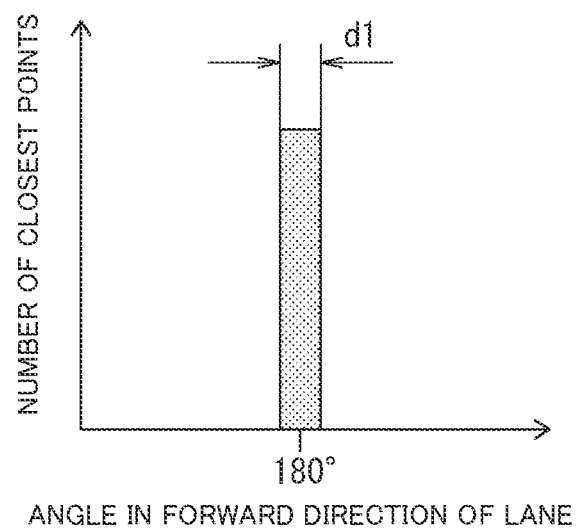
FIG. 7 is a graph illustrating a distribution of angles in a lane forward direction.

The integrated range determination unit 13 sets an initial value of the integrated range, and determines whether the variation (variance) in the angles estimated at the respective constituent points and the respective closest points in the integrated range is a predetermined threshold or greater. When the variation (variance) in the angles is less than the predetermined threshold, the integrated range determination unit 13 expands the integrated range to be the predetermined threshold or greater so as to define the integrated range. For example, when the integrated range A1 illustrated in FIG. 4 is determined such that the lane boundary L7 only includes the straight part L71 and the lane boundary L8 only includes the straight part L81, the variation d1 in the angles at the constituent points P11 and P12 and the closest points P21 to P24 in the integrated range A1 is quite small, as illustrated in FIG. 7. The integrated range determination unit 13 then determines that the variation d1 in the angles is less than the predetermined threshold.

Figure 8:
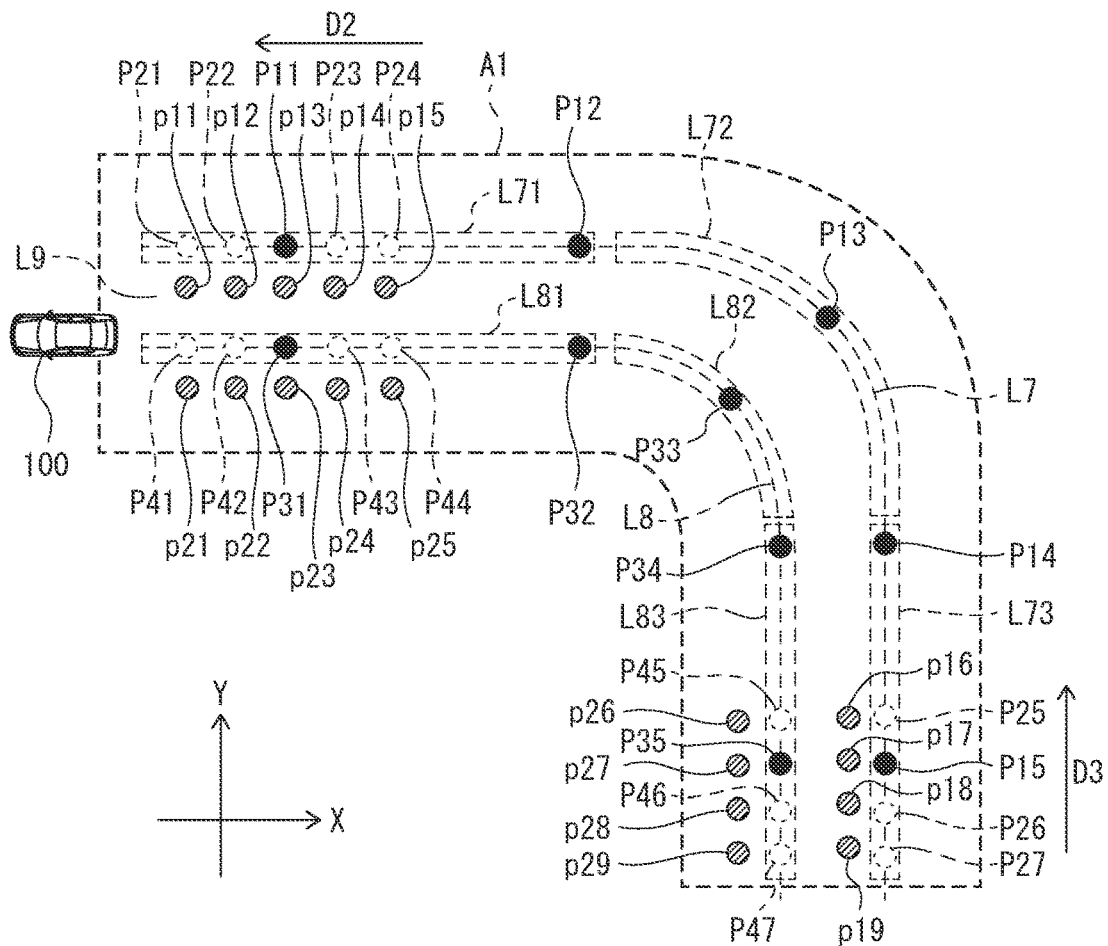
FIG. 8 is an explanatory view illustrating an example of processing of determining an integrated range.
Figure 9:
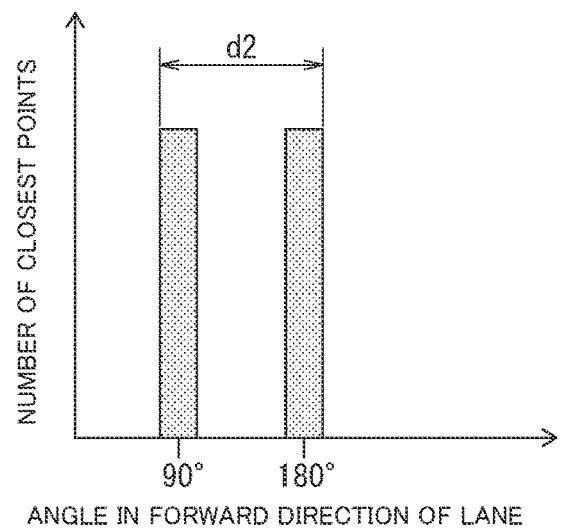
FIG. 9 is a graph illustrating a distribution of angles in a lane forward direction.

The integrated range determination unit 13 thus expands the integrated range A1, as illustrated in FIG. 8, such that the lane boundary L7 includes the three parts L71, L72, and L73, and the lane boundary L8 includes the three parts L81, L82, and L83. The variation d2 in the angles at the respective constituent points P11 to P15 and the closest points P21 to P27 in the integrated range A1 thus increases, as illustrated in FIG. 9, for example. The integrated range determination unit 13 determines that the variation in the angles is the predetermined threshold or greater to define the integrated range A1 illustrated in FIG. 8. While FIG. 8 illustrates the case of defining the integrated range A1 behind the host vehicle 100, the integrated range may be defined including the front region ahead of the host vehicle 100.

When the detection points can be sequentially detected by the periphery sensor 5, for example, the integrated range determination unit 13 may estimate each angle made between a predetermined direction and the forward direction of the lane at the respective detection points. The integrated range determination unit 13 may then determine the integrated range such that the variation (variance) in the angles estimated at the respective detection points is the predetermine threshold or greater.

The matching unit 14 executes the matching (comparison) between the configuration information on the lane boundaries included in the map data and the information on the lane boundaries detected by the periphery sensor 5 while including at least the integrated range determined by the integrated range determination unit 13. The matching may be executed by a conventional method such as iterative closest point (ICP). The term "matching" as used herein refers to a process of executing the mapping between the constituent points in the configuration information on the lane boundaries included in the map data and the detection points upon the detection of the lane boundaries by the periphery sensor 5 (in other words, determining a combination of the detection points and the constituent points corresponding to the detection points). The matching unit 14 outputs the mapping information (the matching result) in which the detection points and the constituent points are mapped together.

For example, as illustrated in FIG. 8, the matching unit 14 executes the mapping between the constituent points P11 and P15 and the closest points P21 to P27 on the boundary lane L7 included in the map data and the detection point p11 to p17 detected by the periphery sensor 5. The matching unit 14 also executes the mapping between the constituent points P31 and P35 and the closest points P41 to P47 on the boundary lane L8 included in the map data and the detection point p21 to p27 detected by the periphery sensor 5.

The integration unit 15 integrates the information on the lane boundaries detected by the periphery sensor 5 and converted into the same coordinate system as the map data, with the configuration information on the lane boundaries included in the map data in accordance with the result of the matching obtained by the matching unit 14 so as to generate integrated data. The term "integrate" as used herein refers to a processing of integrating the data on the detection points detected by the periphery sensor 5 with the data on the constituent points in the map data in the state in which the detection points detected by the periphery sensor 5 and the constituent points in the map data combined through the matching are mapped with each other. The integrated data can be used when a traveling plan is generated, for example. The generated integrated data is stored in the map storage unit 10 in the storage device 2 or any other storage device.

The integration unit 15 may directly integrate the information on the lane boundaries detected by the periphery sensor 5 with the configuration information on the lane boundaries included in the map data, so as to generate the integrated data including the positional coordinates of the detection points detected by the periphery sensor 5 and the positional coordinates of the constituent points included in the map data and mapped with the corresponding detection points. Alternatively, the integration unit 15 may correct the configuration information on the lane boundaries included in the map data in accordance with the matching result obtained by the matching unit 14, so as to generate, as the integrated data, the corrected configuration information on the lane boundaries and the information on the lane boundaries detected by the periphery sensor 5.

The integration unit 15 may optimize the positional coordinates of the constituent points on the lane boundaries included in the map data so as to minimize a positional error between the constituent points on the lane boundaries included in the map data and the detection points detected by the periphery sensor 5. For example, the integration unit 15 may calculate a sum of squares of differences (errors) between the constituent points on the lane boundaries included in the map data and the detection points detected by the periphery sensor 5 so as to minimize the calculated sum. The integration unit 15 may integrate the data detected by the periphery sensor 5 with the map data such that an error is minimized between the entire point group data of the detection points detected by the periphery sensor 5 within the integrated range and the entire point group data of the constituent points on the lane boundaries included in the map data within the integrated range.

The integration unit 15 shifts the positional coordinates of the constituent points P11 and P15 and the closest points P21 to P27 on the boundary line L7 included in the map data as illustrated in FIG. 8, for example, by the same distance in the same direction to calculate the shifted amount such that the total of the positional errors is the smallest, so as to align the constituent points P11 and P15 and the closest points P21 to P27 on the boundary line L7 included in the map data with the detection points p11 to p17 detected by the periphery sensor 5. The integration unit 15 then corrects (updates) the positional coordinates of the constituent points included in the map data stored in the map storage unit 10 so as to be shifted by the shifted amount M. The integration unit 15 may correct all of the constituent points included in the map data, or correct only the constituent points within a predetermined range around the host vehicle.

The integrated range determination unit 13 may repeatedly determine the integrated range at predetermined intervals every time the host vehicle moves. The matching unit 14 may repeatedly perform the processing of matching between the detection points and the constituent points in the integrated range determined by the integrated range determination unit 13 at predetermined intervals every time the host vehicle moves. The integration unit 15 may execute the integration processing of repeatedly correcting the map data, for example, by use of the matching results obtained by the matching unit 14.

The traveling route calculation unit 16 generates a traveling route on which the host vehicle is to travel, in accordance with the integrated data generated by the integration unit 15. The traveling route calculation unit 16 outputs the generated traveling route to the vehicle control device 8.

(Travel Assistance Method)

Figure 10:
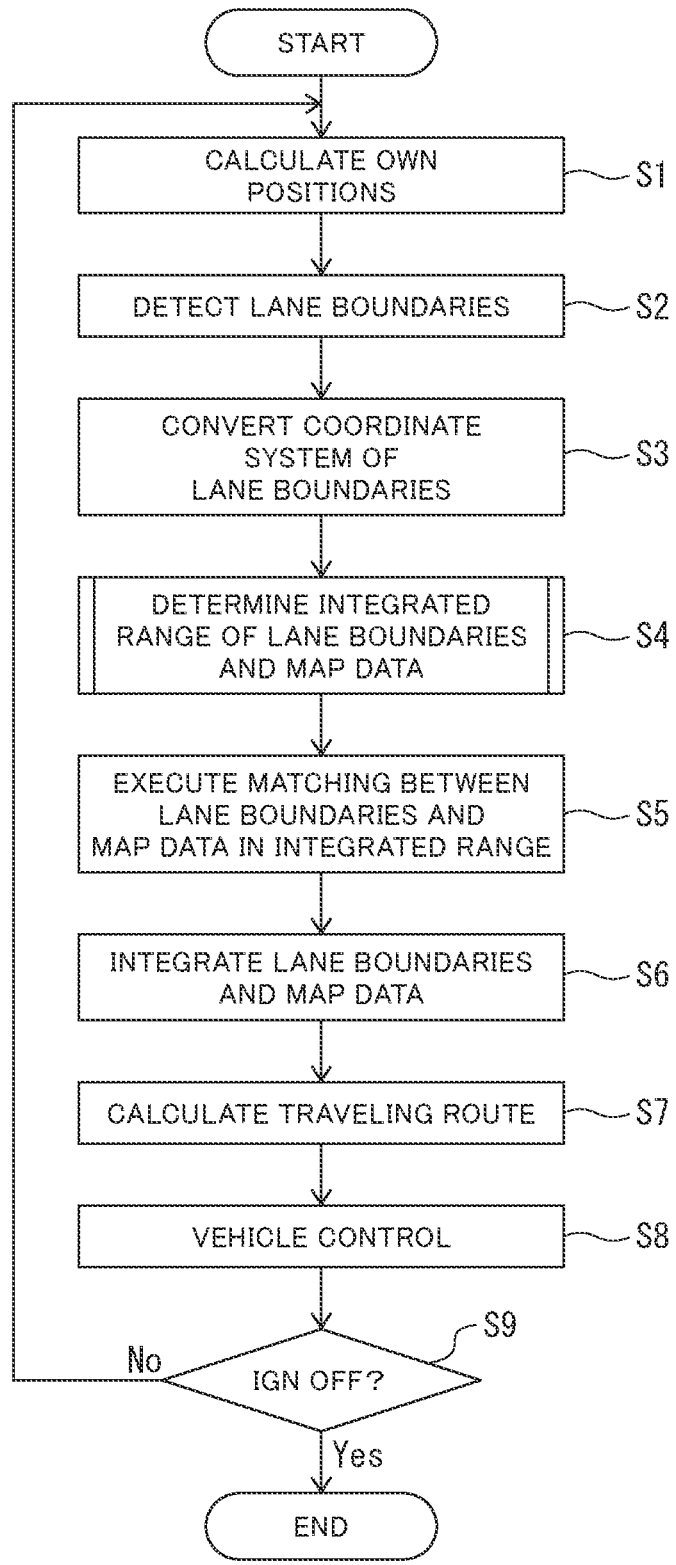
FIG. 10 is a flowchart illustrating an example of a travel assistance method according to an embodiment of the present invention.

An example of the operation (a travel assistance method) of the travel assistance device 1 according to the embodiment of the present invention is described below with reference to the flowchart illustrated in FIG. 10.

In step S1, the own position calculation unit 11 calculates the own positions of the host vehicle acquired from the GPS receiver 3 and the like. In step S2, the boundary recognition unit 12 detects the lane boundaries present around the host vehicle in accordance with the data on the surroundings detected by the periphery sensor 5. In step S3, the integrated range determination unit 13 converts the coordinate system of the lane boundaries detected by the boundary recognition unit 12 into the same coordinate system as the map data.

In step S4, the integrated range determination unit 13 determines the integrated range used when integrating the configuration information on the lane boundaries included in the map data stored in the map storage unit 10 in the storage device 2 with the information on the lane boundaries detected by the periphery sensor 5. For example, the integrated range determination unit 13 determines the integrated range such that the lane boundaries include at least either the plural parts having different curvatures, or the plural straight parts directed in different directions.

Figure 11:
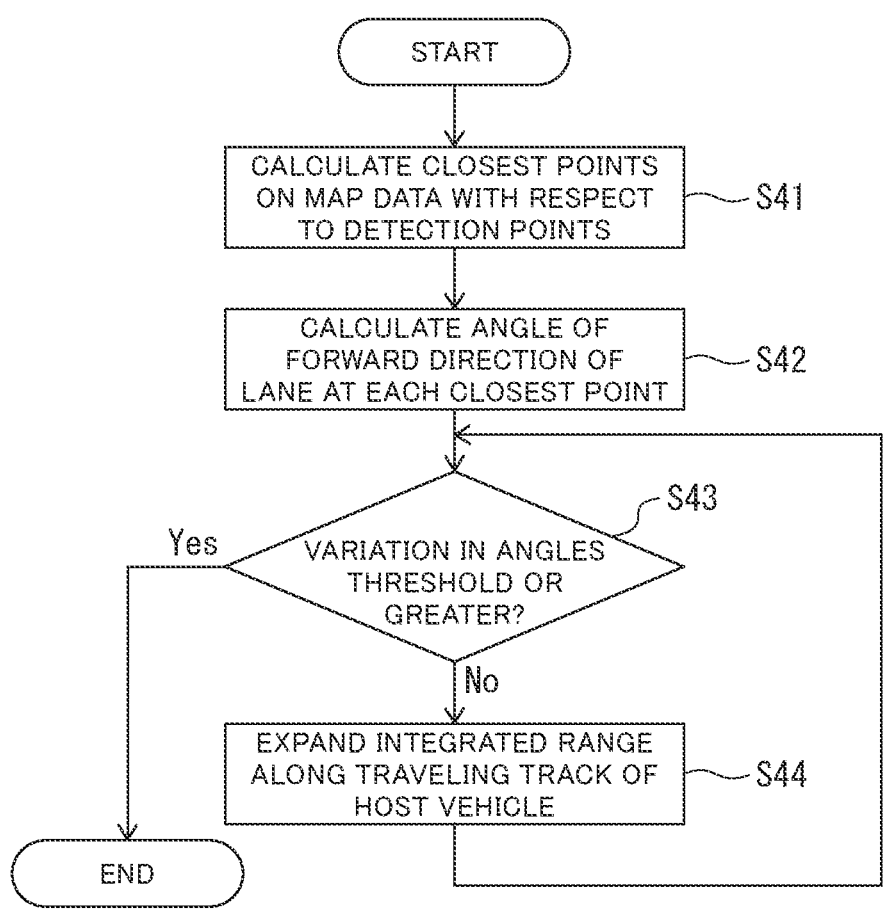
FIG. 11 is a flowchart illustrating an example of processing of determining an integrated range.

An example of the processing of determining the integrated range in step S4 is described in detail below with reference to the flowchart illustrated in FIG. 11. In step S41, the integrated range determination unit 13 calculates the closest points, on the lane boundaries in the map data, with respect to the respective detection points obtained upon the detection of the lane boundaries. In step S42, the integrated range determination unit 13 calculates the angle made between a predetermined direction and the forward direction of the lane at the respective closest points. In step S43, the integrated range determination unit 13 determines whether a variation (variance) in the angles at the respective closest points in the integrated range is a predetermined threshold or greater. When the variation (variance) in the angles is determined to be less than the predetermined threshold, the process proceeds to step S44. The integrated range determination unit 13 then executes the processing of expanding the integrated range in the direction opposite to the forward direction of the vehicle, and the process returns to step S43. When the variation (variance) in the angles is determined to be the predetermined threshold or greater in step S43, the integrated range determination unit 13 finalizes the integrated range to finish the processing of determining the integrated range in step S4.

Returning to FIG. 10. in step S5, the matching unit 14 executes the processing of matching between the information on the road configuration included in the map data and the information on the road configuration detected by the periphery sensor 5 and converted into the same coordinate system as the map data, while including at least the integrated range determined by the integrated range determination unit 13. In step S6, in accordance with the matching result obtained by the matching unit 14, the integration unit 15 integrates the information on the road configuration included in the map data with the information on the road configuration detected by the periphery sensor 5 and converted into the same coordinate system as the map data so as to generate the integrated data. The integration unit 15 stores the generated integrated data in the map storage unit 10.

In step S7, the traveling route calculation unit 16 generates the traveling route on which the host vehicle is to travel, in accordance with the integrated data generated by the integration unit 15. In step S8, the vehicle control device 8 drives the actuator 9 to execute the vehicle control on the host vehicle so as to cause the host vehicle to travel on the traveling route generated by the traveling route calculation unit 16.

In step S9, the processing circuit 6 determines whether an ignition switch (IGN) of the host vehicle is turned off. The process ends when the ignition switch is determined to be turned off. The process returns to step S1 when the ignition switch is determined not to be turned off yet.

Effects of Embodiment

According to the embodiment of the present invention, the integrated range determination unit 13 determines the integrated range such that the lane boundaries have the parts having different curvatures or directed in different directions, when integrating the configuration information on the lane boundaries included in the map data with the information on the lane boundaries detected by the periphery sensor 5 to generate the integrated data. The integrated range determination unit 13 maps and integrates the configuration information on the lane boundaries included in the map data with the information on the lane boundaries detected by the periphery sensor 5 so as to generate the integrated data while including at least the integrated range determined.

The integrated range determination unit 13 thus can determine the integrated range appropriately so that the road configuration of the lane in the integrated range has the characteristics. The accuracy of the processing of matching between the configuration information on the lane boundaries included in the map data and the information on the lane boundaries detected by the periphery sensor 5 thus can be improved, resulting in the appropriate matching. This enables the suitable mapping between the configuration information on the lane boundaries included in the map data and the information on the lane boundaries detected by the periphery sensor 5, while performing the accurate alignment as necessary, so as to generate the integrated data appropriately.

The integrated range determination unit 13 also determines the integrated range such that the respective lane boundaries include the plural straight parts making different angles with a predetermined direction. This can minimize a difference in matching in the forward direction of the lane upon the matching in the simple straight lane, so as to improve the accuracy of matching accordingly.

The integrated range determination unit 13 also calculates the constituent points corresponding to the respective detection points, and estimates the respective angles made between a predetermined direction and the forward direction of the lane at the respective constituent points, so as to determine the integrated range such that the variation (variance) in the angles estimated is a predetermined threshold or greater. This can minimize a difference in matching in the forward direction of the lane upon the matching in the simple straight lane, so as to improve the accuracy of matching accordingly.

The integrated range determination unit 13 also calculates the constituent points corresponding to the respective detection points, and interpolates the respective constituent points by a curve, so as to calculate the closest points on the curve with respect to the detection points. The integrated range determination unit 13 then estimates the respective angles made between a predetermined direction and the forward direction of the lane at the respective closest points, so as to determine the integrated range such that the variation in the angles is a predetermined threshold or greater. This enables the accurate calculation of the forward direction of the lane at the respective closest points.

The integrated range determination unit 13 also estimates the respective angles made between a predetermined angle and the forward direction of the lane at the respective detection points, so as to determine the integrated range such that the variation (variance) in the angles estimated is a predetermined threshold or greater. The estimation of the variation (variance) in the angles in the forward direction of the lane at the detection points, when capable of sequentially detecting the detection points, for example, can minimize a difference in matching in the forward direction of the lane upon the matching in the simple straight road, so as to improve the accuracy of matching accordingly.

The integrated range determination unit 13 repeatedly determines the integrated range, the matching unit 14 repeatedly performs the matching between the detection points and the constituent points in the integrated range determined by the integrated range determination unit 13, and the integration unit 15 repeatedly corrects the map data by use of the matching result, every time the host vehicle moves. Since the correction of the map data is preliminarily performed by use of the previous matching result when performing the matching, the constituent points corresponding to the respective detection points can be detected accurately when the integrated range is determined.

The integration unit 15 generates the integrated data so as to include the front region ahead of the host vehicle in the forward direction outside the integrated range. This enables the preliminary generation of the integrated data in the region before the host vehicle is reaching, in addition to the integrated range in which the matching unit 14 executes the matching.

Figure 12:
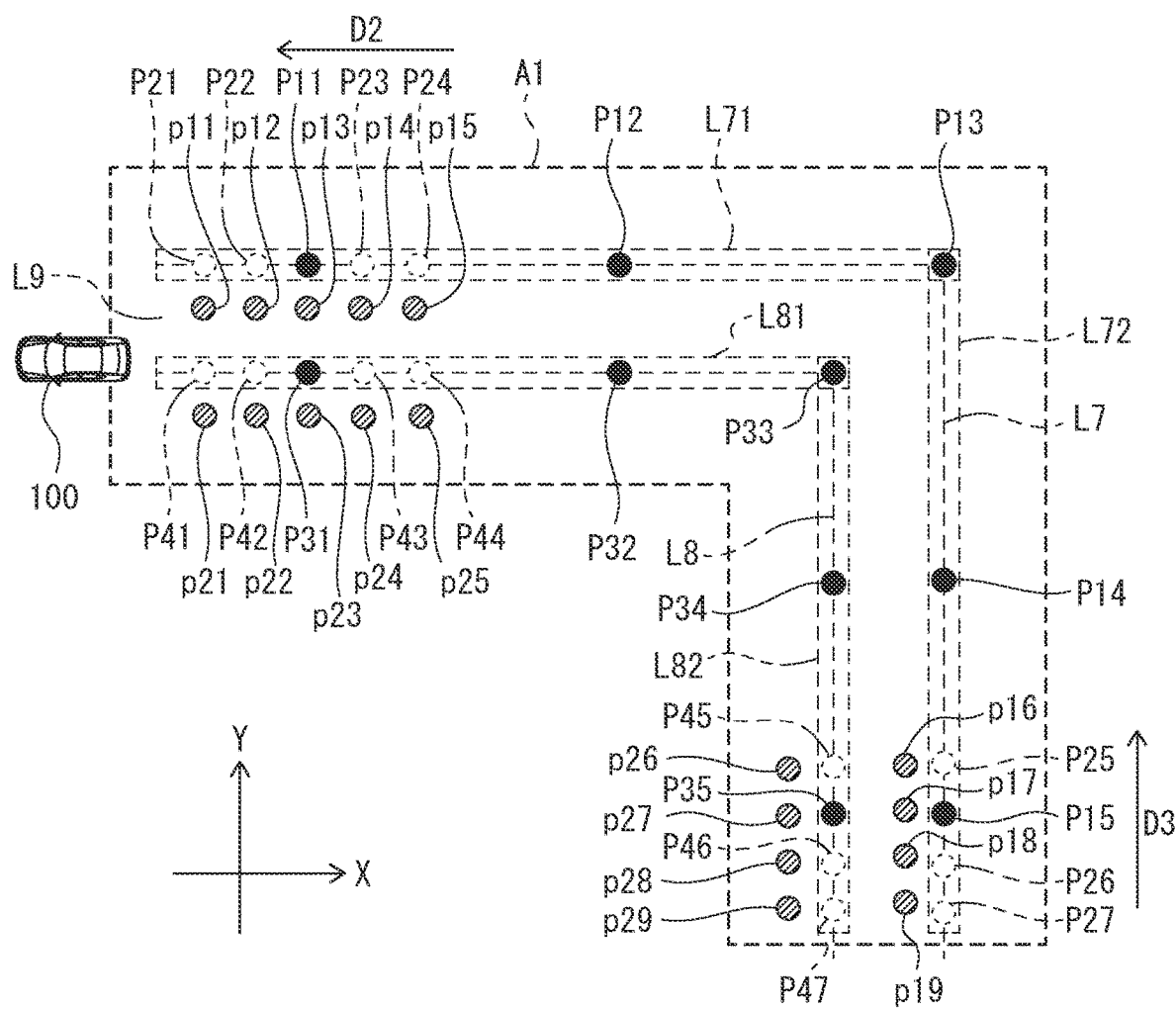
FIG. 12 is an explanatory view illustrating an example of processing of determining an integrated range.

The travel assistance device 1 according to the embodiment of the present invention can be used for various types of road configurations. The following is a case in which the lane L9 is presumed to be curved at a right angle, as illustrated in FIG. 12. The lane boundary L7 has the straight part L71 extending in the forward direction D2, and the straight part L72 connected to the straight part L71 and extending in the forward direction D3 orthogonal to the forward direction D2. The lane boundary L8 has the straight part L81 extending in the forward direction D2, and the straight part L82 connected to the straight part L81 and extending in the forward direction D3 orthogonal to the forward direction D2.

The straight parts L71 and L72 in the lane boundary L7 each have a curvature which is zero, but are directed in different directions. The straight parts L81 and L82 in the lane boundary L8 each have a curvature which is zero, but are directed in different directions. The integrated range determination unit 13 then determines the integrated range A1 so as to include the two straight parts L71 and L72 of the lane boundary L7 and the two straight parts L81 and L82 of the lane boundary L8. The integrated range determination unit 13 may determine the integrated range A1 in accordance with only the information on either the lane boundary L7 or the lane boundary L8.

First Modified Example

A first modified example of the embodiment of the present invention is illustrated below with a case of determining the integrated range in accordance with a variation in forward directions of the host vehicle when the integrated range determination unit 13 determines the integrated range.

Figure 13:
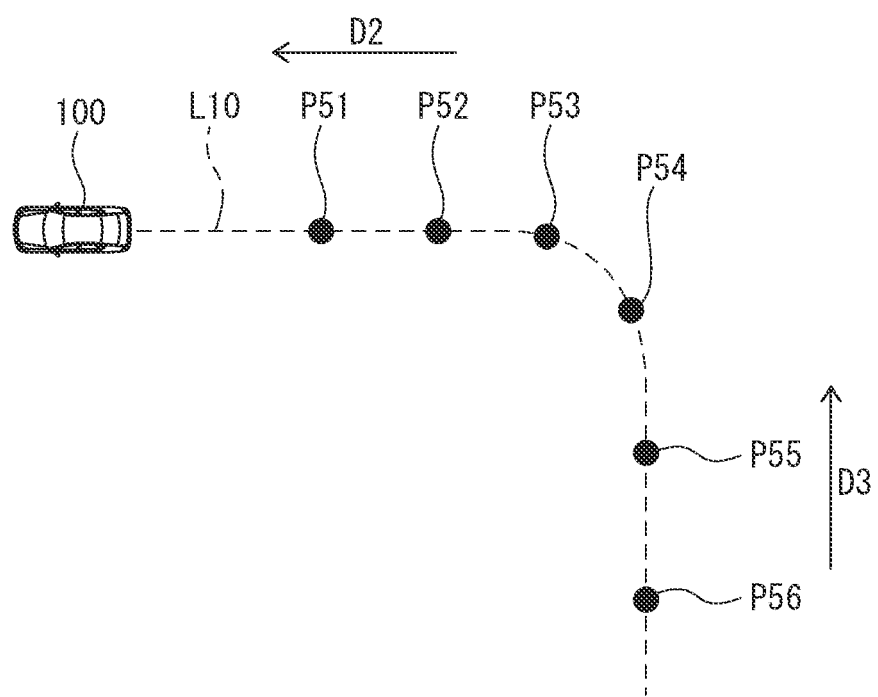
FIG. 13 is an explanatory view illustrating an example of processing of determining an integrated range.

The own position calculation unit 11 sequentially performs the processing of sampling of the own positions along the traveling track of the host vehicle, and calculates a sequence of points P51 to P56 when the periphery sensor 5 can detect the lane boundaries, as illustrated in FIG. 13, for example.

The integrated range determination unit 13 estimates the forward direction of the host vehicle 100 at the respective own positions P51 to P56 calculated by the own position calculation unit 11. For example, the integrated range determination unit 13 may use the attitude of the host vehicle 100 acquired by the GPS receiver 3 as the forward direction of the host vehicle. Alternatively, the integrated range determination unit 13 may interpolate the history (the sequence of points) of the own positions P51 to P56 by the curve L10, and obtain tangents to the curve L10 at the respective own positions P51 to P56, so as to calculate the forward directions of the host vehicle 100. Alternatively, the integrated range determination unit 13 may calculate the forward directions of the host vehicle 100 using the information on the lane to which the host vehicle 100 belongs, when the link information and the like in the map data includes the information on the lane, such as the figure and the type of the lane, to which the host vehicle 100 belongs.

The integrated range determination unit 13 determines the integrated range such that a variation (variance) in the forward directions of the host vehicle 100 at the respective own position P51 to P56 is a predetermined threshold or greater.

According to the first modified example of the embodiment of the present invention, the own positions are calculated when the lane boundaries are detected, and the forward directions of the host vehicle at the respective own positions are estimated, so as to determine the integrated range such that the variance in the forward directions of the host vehicle is the predetermined threshold or greater. Since the first modified example can refer to the information on the own positions with the smaller number than the detection points obtained when detecting the lane boundaries, a difference in the matching can be minimized with less calculation load.

The detection of the forward directions of the host vehicle by the GPS receiver 3 can facilitate the calculation of the forward directions accordingly.

The calculation of the forward directions of the host vehicle through the interpolation of the own positions of the host vehicle by a curve to obtain the tangents to the curve, enables the accurate calculation of the forward directions accordingly.

The calculation of the forward directions of the host vehicle by use of the information on the lane included in the map data to which the host vehicle belongs without the use of the GPS receiver 3, enables the accurate calculation of the forward directions while avoiding the influence of variation of the accuracy of the GPS receiver 3.

Second Modified Example

A second modified example of the embodiment of the present invention is illustrated below with a case of determining the integrated range in accordance with a variation in curvatures of a lane when the integrated range determination unit 13 determines the integrated range.

For example, the integrated range determination unit 13 specifies the constituent points corresponding to the respective detection points detected by the periphery sensor 5, in accordance with the constituent points composing the configuration information on the lane boundaries included in the map data, and estimates the curvature or the radius of curvature of the lane at the respective specified constituent points. For example, a radius of a circumscribed circle of the positional coordinates of a target constituent point and the positional coordinates of two constituent points adjacent to the target constituent point is obtained, so as to calculate the radius of curvature of the lane at the target constituent point. The integrated range determination unit 13 determines the integrated range such that the variation in the curvatures or the radii of curvature of the lane at the respective constituent points is a predetermined threshold or greater.

Alternatively, the integrated range determination unit 13 may specify the constituent points corresponding to the respective detection points detected by the periphery sensor 5, in accordance with the constituent points composing the configuration information on the lane boundaries included in the map data, interpolate the respective specified constituent points by a curve, and calculate the closest points on the curve with respect to the detection points. The integrated range determination unit 13 estimates the curvature or the radius of curvature of the lane at the respective calculated closest points. For example, based on the positional coordinates of a target closest point and the positional coordinates of two closest points adjacent to the target closest point, the integrated range determination unit 13 can calculate the curvature or the radius of curvature of the lane at the target closest point. The integrated range determination unit 13 may determine the integrated range such that the variation in the curvatures or the radii of curvature of the lane at the respective closest points is a predetermined threshold or greater.

For example, as illustrated in FIG. 8, the integrated range determination unit 13 calculates the curvature of the straight part L71 in the lane boundary L7 at the constituent point P11 on the lane boundary L7, as the curvature of the lane L9, based on the positional coordinates of the closest point P22, the constituent point P11, and the closest point P23 on the lane boundary L7. The integrated range determination unit 13 also calculates the curvature of the curved part L72 in the lane boundary L7 at the constituent point P13 on the lane boundary L7, as the curvature of the lane L9, based on the positional coordinates of the constituent points P12, P13, and P14 on the lane boundary L7.

According to the second modified example of the embodiment of the present invention, the curvature or the radius of curvature of the lane at the respective constituent points corresponding to the detection points obtained when detecting the lane boundaries is estimated, so that the integrated range is determined such that the variation (variance) in the curvatures or the radii of curvature of the lane is the predetermined threshold or greater. The estimation of the variation (variance) in the curvatures or the radii of curvature of the lane can minimize a difference in the matching in the forward direction of the lane, which may be caused by the matching performed only on the curve having a constant curvature or radius of curvature, so as to improve the accuracy of the matching accordingly.

In addition, the respective constituent points corresponding to the detection points obtained when detecting the lane boundaries are interpolated by a curve, the closest points on the curve with respect to the respective detection points are calculated, and the curvature or the radius of curvature of the lane at the respective closest points is estimated, so that the integrated range is determined such that the variation (variance) in the curvatures or the radii of curvature of the lane is a predetermined threshold or greater. This enables the accurate calculation of the curvatures or the radii of curvature of the lane accordingly.

Third Modified Example

A third modified example of the embodiment of the present invention is illustrated below with a case of determining the integrated range in accordance with a variation in curvatures or radii of curvature of a traveling track of the host vehicle when the integrated range determination unit 13 determines the integrated range.

The own position calculation unit 11 sequentially performs the processing of sampling of the own positions along the traveling track of the host vehicle, and calculates a sequence of points P51 to P56 when the periphery sensor 5 can detect the lane boundaries, as illustrated in FIG. 13, for example.

The integrated range determination unit 13 estimates the curvature or the radius of curvature of the traveling track of the host vehicle at the respective own positions calculated. The curvature or the radius of curvature of the traveling track of the host vehicle may be calculated according to a yaw rate detected by the yaw rate sensor which is the periphery sensor 5 mounted on the host vehicle. For example, the radius of curvature can be calculated in accordance with the relational expression R=V/Y, where V [m/s] is a speed of the host vehicle, R [m] is a radius of curvature of the traveling track of the host vehicle, and Y [rad/s] is a yaw rate of the hot vehicle.

The integrated range determination unit 13 may interpolate the sequence of points at the own positions by a curve so as to calculate the curvature or the radius of curvature of the traveling track of the host vehicle. When the information on the lane included in the link information in the map data includes the information on the type or the figure of the lane, the integrated range determination unit 13 may calculate the curvature or the radius of curvature of the traveling track of the host vehicle by use of the information on the lane to which the host vehicle belongs.

The integrated range determination unit 13 determines the integrated range such that the variation in the curvatures or the radii of curvature of the traveling track of the host vehicle at the respective own positions is a predetermined threshold or greater.

According to the third modified example of the embodiment of the present invention, the own positions obtained upon the detection of the lane boundaries are sequentially calculated, and the curvature of the traveling track of the host vehicle at the respective own positions is estimated, so as to determine the integrated range such that the variation in the curvatures of the traveling track of the host vehicle is the predetermined threshold or greater. Since the third modified example refers to the information on the own positions with the smaller number than the detection points, a difference in the matching can be minimized with less calculation load.

The calculation of the curvature or the radius of curvature of the traveling track of the host vehicle based on the yaw rate detected by the yaw rate sensor which is the periphery sensor 5 mounted on the host vehicle, can facilitate the calculation of the curvature or the radius of curvature of the traveling track accordingly.

The calculation of the curvature or the radius of curvature of the traveling track of the host vehicle through the interpolation of the sequence of points at the respective own positions by a curve, enables the accurate calculation of the curvature or the radius of curvature of the traveling track accordingly.

The calculation of the curvature or the radius of curvature of the traveling track of the host vehicle by use of the information on the lane included in the map data to which the host vehicle belongs, without the use of the GPS receiver 3 or the yaw rate sensor, enables the accurate calculation of the curvature or the radius of curvature of the traveling track of the host vehicle while avoiding the influence of variation of the accuracy of the GPS receiver 3 or the yaw rate sensor.

Fourth Modified Example

A fourth modified example of the embodiment of the present invention is illustrated below with a case of thinning out the detection points or the own positions in the integrated range when the integrated range determination unit 13 expands the integrated range.

For example, the integrated range determination unit 13 sets the integrated range as initial setting, and expands the integrated range in the direction opposite to the forward direction of the host vehicle (rearward) when the lane boundaries do not include either the plural parts having different curvatures or the plural straight parts directed in different directions in the set integrated range. The integrated range determination unit 13 then thins out the detection points or the own positions in the integrated range. The intervals of thinning out may be determined as appropriate, and may be alternate points or several points, or may be every predetermined distance or irregular intervals. The processing of matching by the matching unit 14 is executed by use of the remaining detection points or own positions, without the use of the detection points or the own positions thinned out upon the processing of matching.

The integrated range determination unit 13 may vary the intervals of thinning out the detection points or the own positions depending on the curvature of the lane in the map data. For example, the integrated range determination unit 13 increases the intervals of thinning out the detection points or the own positions to execute the sampling more often as the curvature of the lane is larger (in other words, as the radius of curvature of the lane is smaller), since the road configuration is presumed to have few characteristics. The integrated range determination unit 13 decreases the intervals of thinning out the detection points or the own positions to execute the sampling roughly as the curvature of the lane is smaller (in other words, as the radius of curvature of the lane is larger).

Alternatively, the integrated range determination unit 13 may vary the intervals of thinning out the detection points or the own positions depending on the length of the lane in the map data. For example, the integrated range determination unit 13 decreases the intervals of thinning out the detection points or the own positions to execute the sampling roughly as the length of the lane is greater, since the road configuration is presumed to have few characteristics. The integrated range determination unit 13 increases the intervals of thinning out the detection points or the own positions to execute the sampling more often as the length of the lane is smaller.

As illustrated in FIG. 4, for example, the integrated range is expanded in the direction opposite to the forward direction of the host vehicle 100 (rearward) in the integrated range A1 after the initial setting since the respective lane boundaries L7 and L8 include only the single straight part L71 or L81. As illustrated in FIG. 8, when the integrated range A1 is expanded, the detection points p12, p14, p16, and p18 are thinned out of the detection points p11 to p19 on the lane boundary L7 in alternate points. The detection points p21 to p29 on the lane boundary L8 are also subjected to the thinning processing in the same manner as the detection points p11 to p19 on the lane boundary L7.

According to the fourth modified example of the embodiment of the present invention, the processing of thinning out the detection points or the own positions in the integrated range upon the expansion can enhance the efficiency of the processing upon the matching, so as to reduce the calculation load accordingly.

Varying the intervals of thinning out the detection points or the own positions depending on the curvature of the lane in the map data so as to, for example, decrease the thinning intervals to execute the sampling roughly when the lane is long and straight and thus has the lane configuration with few characteristics, can efficiently decrease the calculation load without the matching accuracy decreased. When the lane is curved with a large curvature and thus has the lane configuration with significant characteristics, the intervals of thinning out are increased to execute the sampling frequently so as to improve the matching accuracy.

Varying the intervals of thinning out the detection points or the own positions depending on the length of the lane in the map data so as to, for example, execute the sampling more roughly when the lane is long and straight and thus has the lane configuration with few characteristics, can efficiently decrease the calculation load without the matching accuracy decreased.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

Figure 14:
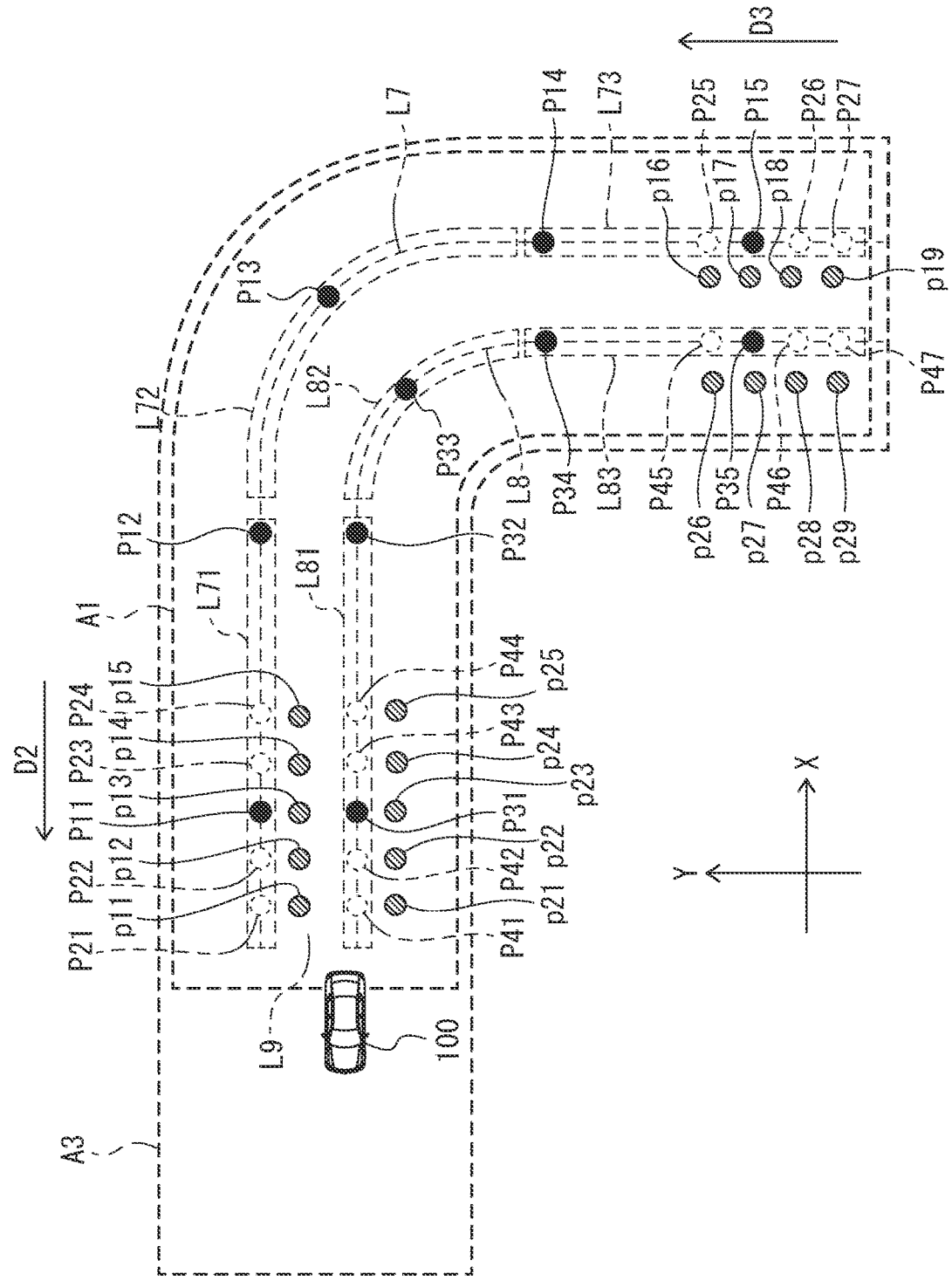
FIG. 14 is an explanatory view illustrating an example of processing of determining an integrated range.

For example, the range in which the integration unit 15 generates the integrated data while integrating the configuration information on the lane boundaries included in the map data with the information on the lane boundaries detected by the periphery sensor 5, is not limited to the inside of the integrated range. The integration unit 15 may integrate the configuration information on the lane boundaries included in the map data with the information on the lane boundaries detected by the periphery sensor 5 in a range including a region outside the integrated range. For example, as illustrated in FIG. 14, the integration unit 15 may generate the integrated data in a range A3 including, in addition to the integrated range A1, a region ahead of the integrated range A1 in the forward direction of the host vehicle 100. This enables the integration unit 15 to preliminarily generate the integrated data in the region before the host vehicle is reaching in which the detection points are not obtained yet.

The integration unit 15 may integrate all the configuration information on the lane boundaries included in the map data in the integrated range with all the information on the lane boundaries detected by the periphery sensor 5. Alternatively, the integration unit 15 may integrate part of the configuration information on the lane boundaries included in the map data in the integrated range with all the information on the lane boundaries detected by the periphery sensor 5. Alternatively, the integration unit 15 may integrate all the configuration information on the lane boundaries included in the map data in the integrated range with part of the information on the lane boundaries detected by the periphery sensor 5.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 TRAVEL ASSISTANCE DEVICE
2 STORAGE DEVICE

3 GLOBAL POSITIONING SYSTEM RECEIVER
4 VEHICLE SENSOR
5 PERIPHERY SENSOR
6 PROCESSING CIRCUIT
7 DISPLAY
8 VEHICLE CONTROL DEVICE
9 ACTUATOR
10 MAP STORAGE UNIT
11 OWN POSITION CALCULATION UNIT
12 BOUNDARY RECOGNITION UNIT
13 INTEGRATED RANGE DETERMINATION UNIT
14 MATCHING UNIT
15 INTEGRATION UNIT
16 TRAVELING ROUTE CALCULATION UNIT
100 HOST VEHICLE

The invention claimed is:

1. A travel assistance method comprising:
    detecting a lane boundary present around a vehicle by a sensor;
    calculating own positions of the vehicle;
    converting a coordinate system of the lane boundary detected by the sensor into a coordinate system equivalent to map data stored in a storage device in accordance with the own positions;
    integrating configuration information on the lane boundary included in the map data with the lane boundary of which the coordinate system is converted so as to generate integrated data,
        wherein a range of the lane boundary of which the coordinate system is converted including only a straight part in one direction only is not determined as a matching range,
        wherein the range of the lane boundary of which the coordinate system is converted including at least either a plurality of parts having different curvatures or a plurality of straight parts directed in different directions is determined as the matching range,
        wherein the matching range is initially set rearward of the vehicle, and the set matching range is expanded in a direction opposite to a forward direction of the vehicle so as to include at least either the plurality of parts or the plurality of straight parts when the lane boundary of the set matching range does not include either the plurality of parts or the plurality of straight parts,
        wherein matching is executed between the configuration information and the lane boundary of which the coordinate system is converted within a range including at least the matching range,
        wherein the configuration information and the lane boundary of which the coordinate system is converted are integrated in accordance with a result of the matching so as to generate the integrated data; and
    controlling at least one component of the vehicle using the integrated data.

2. The travel assistance method of claim 1, wherein each of the plural straight parts makes an angle different from each other with a predetermined direction.

3. A travel assistance method comprising:
    detecting a lane boundary present around a vehicle by a sensor;
    calculating own positions of the vehicle;
    converting a coordinate system of the lane boundary detected by the sensor into a coordinate system equivalent to map data stored in a storage device in accordance with the own positions;
    integrating configuration information on the lane boundary included in the map data with the lane boundary of which the coordinate system is converted so as to generate integrated data,
        wherein a matching range is determined such that the lane boundary of which the coordinate system is converted includes at least either a plurality of parts having different curvatures of a plurality of straight parts directed in different directions, matching is executed between the configuration information and the lane boundary of which the coordinate system is converted within a range including at least the matching range, and the configuration information and the lane boundary of which the coordinate system is converted are integrated in accordance with a result of the matching so as to generate the integrated data,
        wherein each of the plurality of straight parts makes an angle different from each other with a predetermined direction;
    specifying constituent points composing the configuration information which correspond to detection points obtained when detecting the lane boundary;
    estimating an angle, at the respective specified constituent points, made between the predetermined direction and a forward direction of a lane defined by the lane boundary;
    determining the matching range based on a variation in the estimated angles, wherein the variation in the estimated angles is greater than or equal to a predetermined threshold in the determined matching range; and
    controlling at least one component of the vehicle using the integrated data.

4. The travel assistance method of claim 2, further comprising:
    specifying constituent points composing the configuration information and corresponding to detection points obtained when detecting the lane boundary;
    interpolating the respective specified constituent points by a curve;
    calculating closest points on the curve with respect to the respective detection points;
    estimating an angle, at the respective calculated closest points, made between the predetermined direction and a forward direction of a lane defined by the lane boundary; and
    determining the matching range such that a variation in the angles is a predetermined threshold or greater.

5. A travel assistance method comprising:
    detecting a lane boundary present around a vehicle by a sensor;
    calculating own positions of the vehicle;
    converting a coordinate system of the lane boundary detected by the sensor into a coordinate system equivalent to map data stored in a storage device in accordance with the own positions;
    integrating configuration information on the lane boundary included in the map data with the lane boundary of which the coordinate system is converted so as to generate integrated data,
        wherein a matching range is determined such that the lane boundary of which the coordinate system is converted includes at least either a plurality of parts having different curvatures of a plurality of straight parts directed in different directions, matching is executed between the configuration information and the lane boundary of which the coordinate system is converted within a range including at least the matching range, and the configuration information and the lane boundary of which the coordinate system is converted are integrated in accordance with a result of the matching so as to generate the integrated data;

wherein each of the plurality of straight parts makes an angle different from each other with a predetermined direction;

estimating an angle, at detection points obtained when detecting the lane boundary, made between the predetermined direction and a forward direction of a lane defined by the lane boundary;

determining the matching range based on a variation in the estimated angles, wherein the variation in the estimated angles is greater than or equal to a predetermined threshold in the determined matching range; and controlling at least one component of the vehicle using the integrated data.

6. A travel assistance method comprising:

detecting a lane boundary present around a vehicle by a sensor;

calculating own positions of the vehicle;

converting a coordinate system of the lane boundary detected by the sensor into a coordinate system equivalent to map data stored in a storage device in accordance with the own positions;

integrating configuration information on the lane boundary included in the map data with the lane boundary of which the coordinate system is converted so as to generate integrated data, wherein a matching range is determined such that the lane boundary of which the coordinate system is converted includes at least either a plurality of parts having different curvatures of a plurality of straight parts directed in different directions, matching is executed between the configuration information and the lane boundary of which the coordinate system is converted within a range including at least the matching range, and the configuration information and the lane boundary of which the coordinate system is converted are integrated in accordance with a result of the matching so as to generate the integrated data, calculating a sequence of points of the own positions when the lane boundary is detected;

estimating a forward direction of the vehicle at the respective calculated own positions;

determining the matching range based on a variation in the estimated forward directions of the vehicle, wherein the variation in the estimated forward directions of the vehicle is greater than or equal to a predetermined threshold in the determined matching range; and controlling at least one component of the vehicle using the integrated data.

7. The travel assistance method of claim 6, further comprising detecting the forward direction of the vehicle by a global positioning system receiver mounted on the vehicle.

8. The travel assistance method of claim 6, further comprising:

interpolating the respective calculated own positions by a curve; and obtaining a tangent to the curve so as to calculate the forward direction of the vehicle.

9. The travel assistance method of claim 6, further comprising calculating the forward direction of the vehicle by use of information on a lane to which the vehicle belongs included in the map data.

10. The travel assistance method of claim 1, further comprising:

specifying constituent points composing the configuration information which correspond to detection points obtained when detecting the lane boundary;

estimating a curvature of a lane defined by the lane boundary at the respective specified constituent points; and determining the matching range such that a variation in the curvatures is a predetermined threshold or greater.

11. The travel assistance method of claim 1, further comprising:

specifying constituent points composing the configuration information which correspond to detection points obtained when detecting the lane boundary;

interpolating the respective specified constituent points by a curve;

calculating closest points on the curve with respect to the respective detection points;

estimating a curvature of a lane defined by the lane boundary at the respective calculated closest points; and determining the matching range such that a variation in the curvatures of the lane is a predetermined threshold or greater.

12. The travel assistance method of claim 1, further comprising:

calculating a sequence of points of the own positions when the lane boundary is detected;

estimating a curvature of a traveling track of the vehicle at the respective calculated own positions; and determining the matching range such that a variation in the curvatures of the traveling track is a predetermined threshold or greater.

13. The travel assistance method of claim 12, further comprising calculating the curvature of the traveling track according to a yaw rate detected by a yaw rate sensor mounted on the vehicle.

14. The travel assistance method of claim 12, further comprising interpolating the sequence of points of the own positions by a curve so as to calculate the curvature of the traveling track.

15. The travel assistance method of claim 12, further comprising calculating the curvature of the traveling track by use of information on a lane to which the vehicle belongs included in the map data.

16. The travel assistance method of claim 1, further comprising:

mapping the configuration information with the lane boundary of which the coordinate system is converted every time the vehicle moves; and repeatedly correcting the map data by use of a result after the mapping.

17. The travel assistance method of claim 1, further comprising, when expanding the matching range, thinning out detection points obtained when detecting the lane boundary within the matching range, or the own positions calculated when detecting the lane boundary.

18. The travel assistance method of claim 17, further comprising varying an interval of thinning out depending on a curvature of a lane defined by the lane boundary within the matching range.

19. The travel assistance method of claim 17, further comprising varying an interval of thinning out depending on a length of a lane defined by the lane boundary within the matching range.

20. The travel assistance method of claim 1, further comprising generating the integrated data so as to include a front region ahead of the vehicle in a forward direction of the vehicle outside the determined matching range.

21. A travel assistance device comprising:
- a sensor configured to detect a lane boundary present around a vehicle;
- a storage device configured to store map data; and
- a controller configured to calculate own positions of the vehicle, convert a coordinate system of the lane boundary detected by the sensor into a coordinate system equivalent to the map data in accordance with the own positions, and integrate configuration information on the lane boundary included in the map data with the lane boundary of which the coordinate system is converted so as to generate integrated data,
- wherein the controller is configured not to determine a range of the lane boundary of which the coordinate system is converted including only a straight part in one direction only as a matching range, but to determine a range of the lane boundary of which the coordinate system is converted including at least either a plurality of parts having different curvatures or a plurality of straight parts directed in different directions as the matching range, wherein the matching range is initially set rearward of the vehicle, and the set matching range is expanded in a direction opposite to a forward direction of the vehicle so as to include at least either the plurality of parts or the plurality of straight parts when the lane boundary of the set matching range does not include either the plurality of parts or the plurality of straight parts,
- wherein the controller is configured to execute matching between the configuration information and the lane boundary of which the coordinate system is converted within a range including at least the matching range,
- wherein the controller is configured to integrate the configuration information with the lane boundary of which the coordinate system is converted in accordance with a result of the matching so as to generate the integrated data, and
- wherein the controller is configured to control at least one component of the vehicle using the integrated data.

* * * * *